Aug. 31, 1954

C. G. WESTWOOD 2,687,832

GARMENT FOLDING MACHINE

Filed April 27, 1949

INVENTOR.
Carridon G. Westwood.
BY
Thiess, Olson & Mecklenburger.

Aug. 31, 1954    C. G. WESTWOOD    2,687,832
GARMENT FOLDING MACHINE

Filed April 27, 1949    8 Sheets-Sheet 6

INVENTOR.
Carridon G. Westwood.
BY
Thiess, Olson & Mecklenburger.
Attys.

Aug. 31, 1954     C. G. WESTWOOD     2,687,832
GARMENT FOLDING MACHINE

Filed April 27, 1949     8 Sheets-Sheet 7

Patented Aug. 31, 1954

2,687,832

UNITED STATES PATENT OFFICE 2,687,832

GARMENT FOLDING MACHINE

Carridon G. Westwood, South Bend, Ind., assignor to Automatic Folding Machine Co., Chicago, Ill., a corporation of Illinois Application April 27, 1949, Serial No. 90,031

35 Claims. (Cl. 223—37)

This invention relates to folding machines and, more particularly, to a machine for folding shirts and the like.

Various types of folding machines have heretofore been proposed which have increased somewhat the efficiency of such an operation. However, these machines still rely on the manual skill of the operator to properly fold the tail portion of the shirt over the back of the bosom or upper end portion thereof in order to complete the folding operation. The performance of this step of the operation by the operator has a number of decided disadvantages; for instance, the time required for the folding operation is increased, the neatness and uniformity of the folds depend upon the experience and skill of the operator, and the tail-folding operation is a monotonous and tedious task for the operator.

Thus, it is one of the objects of this invention to provide a machine which will completely and automatically fold a shirt.

It is a further object of this invention to provide a machine which will completely, automatically, and uniformly fold a shirt regardless of its size.

It is a further object of this invention to provide a machine whose power unit and associated working parts are mounted on a substantially flat horizontal working surface, over which the garment is laid, thereby enabling said working surface to be supported in various ways depending upon the circumstances.

It is a further object of this invention to provide a machine whose parts may be readily disassembled for cleaning by the operator when required.

It is a further object of this invention to provide a machine having a substantially free unobstructed surface over which the garment is laid, thereby enabling the operator to perform his duties without injury to himself or the garment.

It is a further object of this invention to provide a machine whereby the time required for the cycle of operation may be varied.

It is still a further object of this invention to provide a machine which will completely fold a shirt, or other similar garment, and is provided with means for automatically feeding a cardboard templet onto a folding form about which the shirt is folded; the templet adapted to remain in the folded shirt upon removal of the shirt from the folding form.

It is still a further object of this invention to provide a machine which will completely fold a shirt as well as tuck the end of the tail portion back under the first fold of said tail portion.

It is still a further object of this invention to provide a machine which will completely fold a shirt and then embrace the folded shirt with a strip of banding tape.

It is still a further object of this invention to provide a folding machine, which is effective and efficient in operation, and durable and compact in construction.

Further and additional objects will appear from the description, the accompanying drawings, and the appended claims.

In accordance with one embodiment of this invention, a folding machine is provided comprising a table over the top of which a garment may be laid face down thereon. Disposed centrally on the top and extending substantially the length thereof is a well into which the center portion of the garment is positioned by the operator. The well comprises a pair of parallel, vertically-extending walls and a substantially horizontal base. Mounted along either wall and extending substantially the length thereof is a folding rod. Each rod is adapted to alternately reciprocate in a direction thwartwise the well and fold the side portions of the garment over the center portion thereof.

Following the folding of the side portions of the garment, a folding arm is actuated to move in a direction lengthwise the well and fold the lower end portion of the garment over a pair of extended rest bars. The lower end portion of the garment is temporarily held in a suspended position above the upper end portion of the garment by the rest bars while the folding arm is receding into the well. The end or edge of the lower end portion of the garment overhangs the rest bars and, upon receding of the folding arm in a lengthwise direction, a pair of fold-back fingers are actuated and fold said end or edge of the garment back under the first fold of said lower end portion. Upon completion of this foldback operation by the fold-back fingers, the rest bars are retracted into the well walls and the tail portion falls into place over the back of the bosom or upper end portion of the shirt. Following this folding operation, the garment is embraced by a banding tape, the ends of which are joined together by the operator before removing the folded garment from the table top. Following removal of the folded garment from the table top, the form plate, about which the garment is folded, is raised to its fully-opened position whereupon a cardboard templet is automatically positioned on one face thereof. Another garment is then positioned face down on the table top, and the templet and form plate laid over the back of said garment by the operator and the above cycle of operation repeated.

For a more complete understanding of this invention, reference should now be had to the drawings, wherein.

Referring now to the drawings, a folding machine is provided comprising a table 30 over the top 31 of which a shirt 32, or other like garment, is laid face down by the operator. Centrally positioned on the top 31 and extending the entire length thereof is a well 33. The well comprises a pair of parallel vertically-extending sides or walls 34 and 35 and a horizontal base 36. The operator, when placing the unfolded shirt 32 on the table top, aligns and positions the center portion 32a of the shirt into the well and fits the collar 32b over the collar expander mechanism 37 mounted on the base 36 and at one end of the well. The expander mechanism 37 will be more fully described hereinafter. The side portions 32c and 32d of the shirt are spread out over the table top 31 as seen in Fig. 10.

Mounted along either of the well walls 34 and 35 and extending substantially the length thereof are folding rods 38 and 40, respectively, which are adapted to alternately reciprocate in a direction thwartwise the well. As each rod 38 and 40 moves across the well, the side portions 32c and 32d respectively, are folded over the center portion 32a of the shirt 32 as seen in Figs. 11 and 12.

Figures 10, 11, 12, 13:
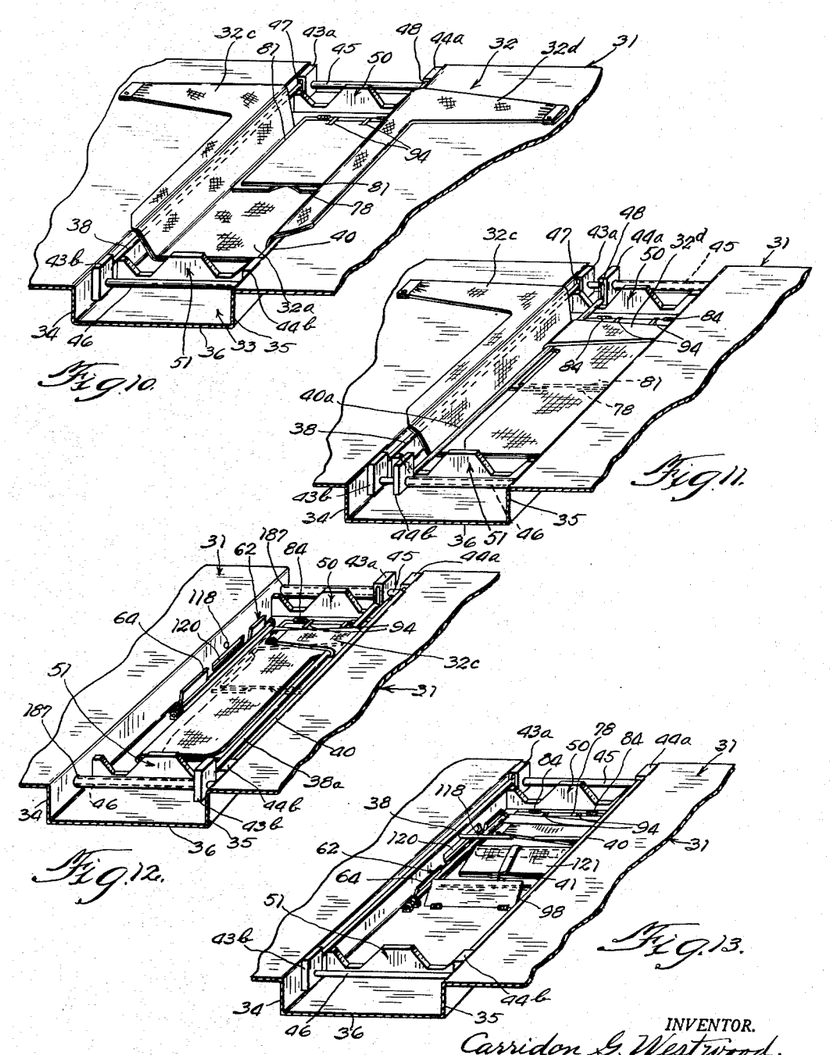
Fig. 10 is a fragmentary, perspective view of the table top with an unfolded shirt positioned face down thereon and the form plate resting on the back of said shirt, prior to the commencing of the folding operation.
Fig. 11 is like Fig. 10 but showing one of the side portions of the shirt folded in the well.
Fig. 12 is like Fig. 10 but showing both side portions of the shirt folded in the well.
Fig. 13 is like Fig. 12 but showing the tail portion of the shirt being folded over the bosom or top portion thereof.
Figure 16:
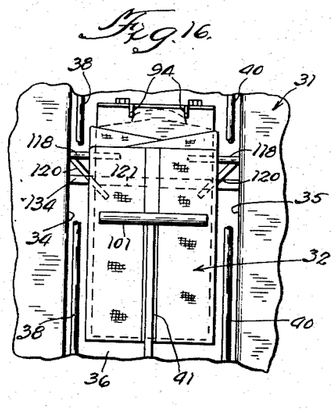
Fig. 16 is a top plan view of Fig. 15.

Following the reciprocatory movement of the folding rods 38 and 40 across the well, a tail-folding arm 41 is actuated which is adapted to project through an opening 42 provided in the well base 36 and to extend a substantial distance over the top or bosom portion of the shirt and to fold the tail-portion of the shirt thereover (see Fig. 13). The complete folding of the tail-portion of the shirt will be discussed more fully later.

The ends of the folding rods 38 and 40 are embraced by a pair of supporting blocks 43 and 44 respectively. The blocks 43 and 44 are slidably mounted on guide rods 45 and 46 which are positioned at either end of the well and extend the entire width of the top. The faces of the blocks 43 and 44 adjacent the ends of the folding rods are provided with elongated, vertically-extending slots or grooves 47 and 48 respectively. These slots allow vertical adjustment of the folding rods 38 and 40 when they are moving thwartwise the well. The purpose of providing for vertical adjustment will become apparent in the later description.

Figures 4, 5, 19, 20:
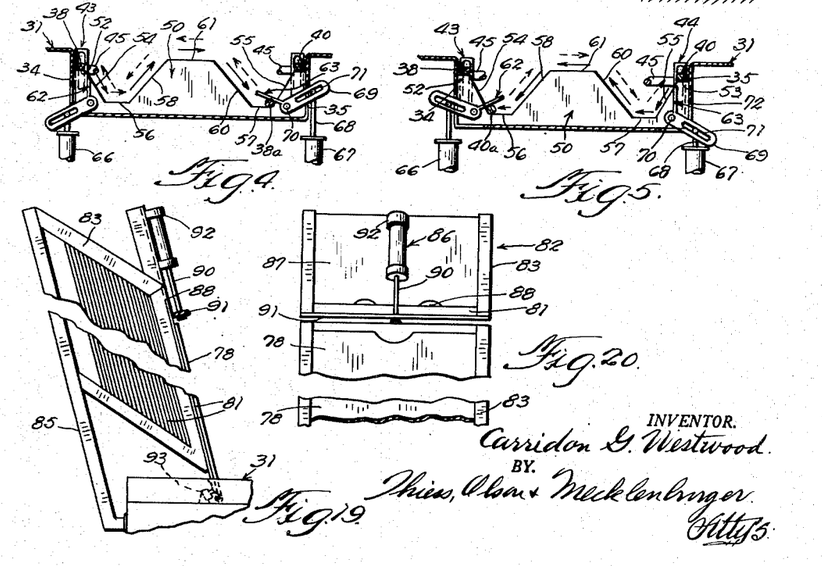
Fig. 4 is a fragmentary end view of the well showing one of the folding rods in its rest and extreme fold positions; the travel of said folding rod on its folding stroke, indicated by full arrows, and the travel on its return stroke to rest position indicated by dotted arrows.
Fig. 5 is like Fig. 4 but showing the movement of the other folding rod across the well.
Fig. 19 is a fragmentary, side-elevational view of the templet-feeding mechanism.
Fig. 20 is a fragmentary front view of Fig. 19.

Mounted on the well base 36, intermediate the supporting blocks 43 and 44, are a pair of track members 50 and 51. Track member 50 is positioned at one end of the well adjacent supporting blocks 43a and 44a, and track member 51 is positioned at the opposite end of the well adjacent blocks 43b and 44b. The upper edges of the track members serve as supporting ledges for the corresponding end portions of the folding rods. The upper edges of the track members are deformed in a like manner. As seen in Figs. 4 and 5, the portions 52 and 53 of the edge adjacent the well walls 34 and 35, respectively, are spaced relatively far above the well base 36 and are parallel thereto and extend a short distance toward the center of the well. Edge portions 54 and 55 are inclined downwardly at an angle of approximately 60° toward the well base and terminate at edge portions 56 and 57, respectively, which are spaced relatively close to the well base and are parallel thereto. Edge portions 58 and 60 are inclined upwardly at an angle of approximately 45° from portions 56 and 57, respectively. Edge portion 61 is spaced relatively far from the well base and is parallel thereto and connects edge portions 58 and 60. The deformation of the upper edges of the track members is to prevent drag-back of the side portions 32c and 32d of the shirt by the folding rods 38 and 40 upon return to their rest positions on edge portions 52 and 53. The drag-back and means for preventing the same will be described more fully later.

The path followed by the folding rods 38 and 40 when moving across the well is shown in Figs. 4 and 5 respectively. It is to be noted that each rod moves across the well to the edge portions 54 and 55 on the opposite side of the well and then reverses direction. The fold stroke or movement of the rods toward the opposite well wall are shown in full arrows and the return stroke in dotted arrows. As shown in Fig. 4, the folding rod 38 is shown in its rest position and in its extreme forward fold position 38a. In Fig. 5 the same positions are shown for rod 40, the extreme forward fold position being indicated as 40a.

Figure 23:
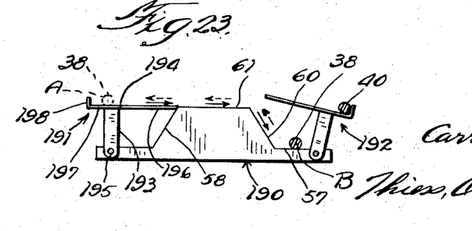
Fig. 23 is a modified form of the track member for the folding rods.

A modified form of track member 190 is shown in Fig. 23 wherein edge portions 52, 53, 54, and 55 have been replaced by a pair of rocker supports 191 and 192. The supports are of like construction comprising a pivot arm 193 and a crosspiece 194. The arm 193 is pivotally mounted at one end 195 on the track member 190. Transversely mounted on the other end of pivot arm 193 is the crosspiece 194. The length of arm 193 is substantially the same as the height of edge portion 61 above the base of the member so that when the support is in its upright position one side 196 of crosspiece 194 engages the adjacent edge portion 58 or 60 of the track member whereby the crosspiece is flush with edge portion 61. The other side 197 of crosspiece 194 is foreshortened and has the outer end turned upwardly to form a lip 198. When the folding rods 38 and 40 are in their rest positions, the rocker supports 191 and 192, respectively, are in their tilted positions (see support 192 in Fig. 23), and the side 196 of the crosspiece 194 is held away from the adjacent edge portion of the track member. The movement of folding rod 38 during its folding stroke is indicated by the full arrows in Fig. 23. When rod 38 is in position A, the rocker support 191 assumes its upright position and the rod 38 passes from the crosspiece 194 onto edge portion 61 and then descends along edge portion 60 to edge portion 57 and, then, along edge portion 57 to its extreme fold position B, at which point the rod reverses its direction and returns to its rest position as indicated by dotted arrows. A similar path is followed by rod 40. The rocker supports and deformed edge of the track member prevent drag-back of the folded side portion of the shirt by the rod upon its return to its starting or rest position.

Mounted on the base of the well and beneath folding rods 38 and 40, when they are in their rest positions, are holding fingers 62 and 63 respectively. The flange portions 64 and 65 of the fingers are adapted to engage the fold of the side portions 32d and 32c, respectively, when the folding rods reach their extreme fold positions. The fingers are rotatably mounted on the base and are adapted to swing through an arc of approximately 110°. As the folding rods commence their return trip to their rest position, the flange portions retain the side portions of the shirt in their folded position. The fingers 62 and 63 are alternately actuated by air cylinders 66 and 67 mounted on the underside of the table top. The piston rod 68 of cylinder 67 is pivotally connected to lever 69. Lever 69 is rigidly mounted to holding finger 63 so that the finger 63 and lever 69 will rotate as a unit about the axis 70. An elongated slot 71 is provided in lever 69 in which the end of piston rod 68 slides. A suitable slit 72 is formed in the wall 35 and base 36 of the well through which lever 69 extends.

Figures 6, 7, 8, 9:
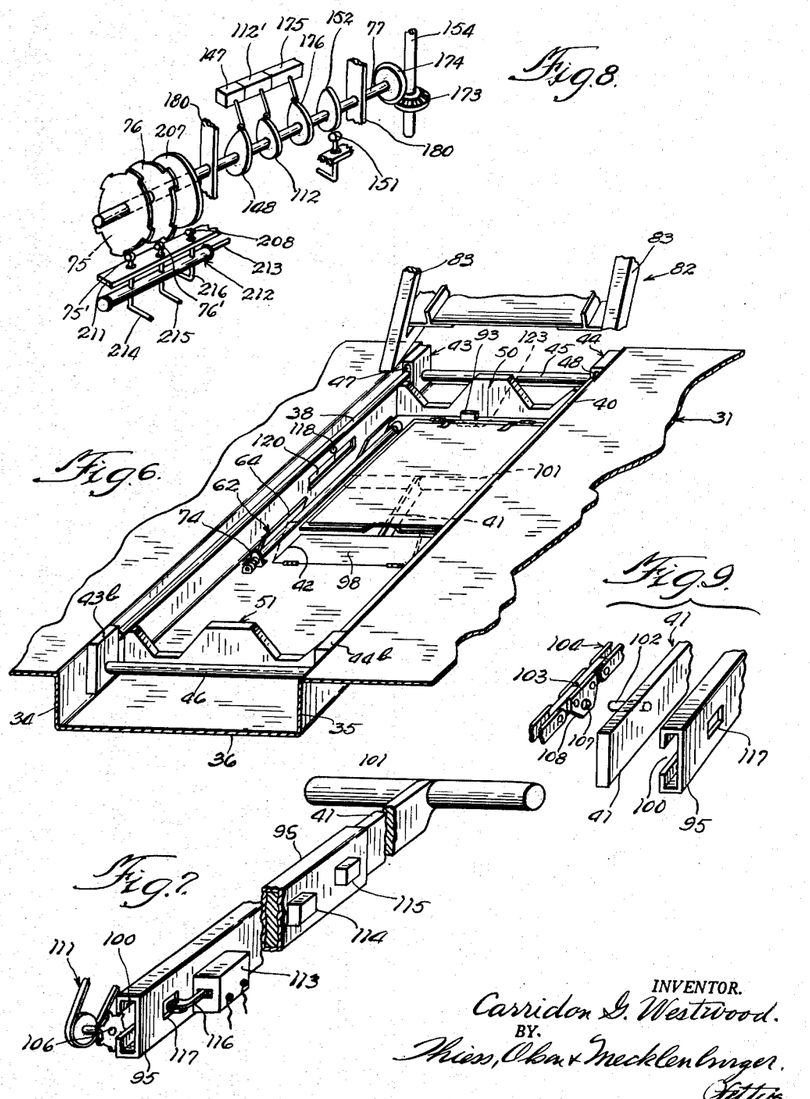
Fig. 6 is a fragmentary perspective view of the well with the shirt removed and the form plate in its operative position. The operative position of the tail-folding arm is shown in dotted lines.
Fig. 7 is a fragmentary perspective view of one side of the tail-folding mechanism.
Fig. 8 is a fragmentary, perspective view of the timing mechanism for the machine.
Fig. 9 is a fragmentary, exploded perspective view of the drag link, comprising a part of the chain drive; the folding arm; and the guide plate.

When the folding rod 38 is in position 38a, the cylinder piston rod 68 is extended and the finger 63 is in its holding position, as seen in Fig. 4. Upon the piston rod being retracted, the finger 63 assumes its normal upright, non-holding position. A similar linkage arrangement is provided for air cylinder 66 and finger 62. The cycle of operation of the air cylinders is controlled by a pair of timing discs 75 and 76, adjustably mounted on timing shaft 77 cooperating with trip and release valves 75' and 76', as seen in Fig. 8. Disc 75 controls the operation of cylinder 66, and disc 76 controls the operation of cylinder 67. The timing mechanism will be discussed more fully later.

Figure 26:
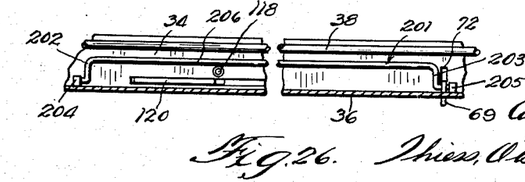
Fig. 26 is a fragmentary, side-elevational view of a modified form of holding finger.

A modified form of holding finger 201 is shown in Fig. 26. The finger is of tube-like construction and has its ends 202 and 203, which are offset and substantially parallel to each other, rotatably mounted in bearings 204 and 205, respectively, which in turn are mounted on the base 36 of the well. A crosspiece 206 joins ends 202 and 203. The fingers 201 are actuated in the same manner as heretofore described for the fingers 63 and 64.

Hingedly mounted on the base 36 of the well, adjacent track member 50, is a form plate 78. The plate is constructed preferably of sheet metallic material, and is of such a width that it will freely pass between the holding fingers and its length is such that it extends approximately midway between the track members, heretofore described. The plate, when in its operative position, is laid over the back of the top center or bosom portion of the shirt 32. The form plate, when in this position, is substantially horizontal and does not interfere with the operation of the folding rods 38 and 40. A safety switch 80 is mounted on the well base 36 so that it is actuated by the form plate when it is in its operative position. When the switch is closed by the plate, power to the machine is fed to the operator switch 79, whereupon the operator may start the machine by closing switch 79. The operator switch 79 is mounted on the base 36 of the well near track member 51 (see Fig. 2), so that when the tail of the shirt has been aligned in the well by the operator the switch will be adjacent the end of the tail.

Figure 1:
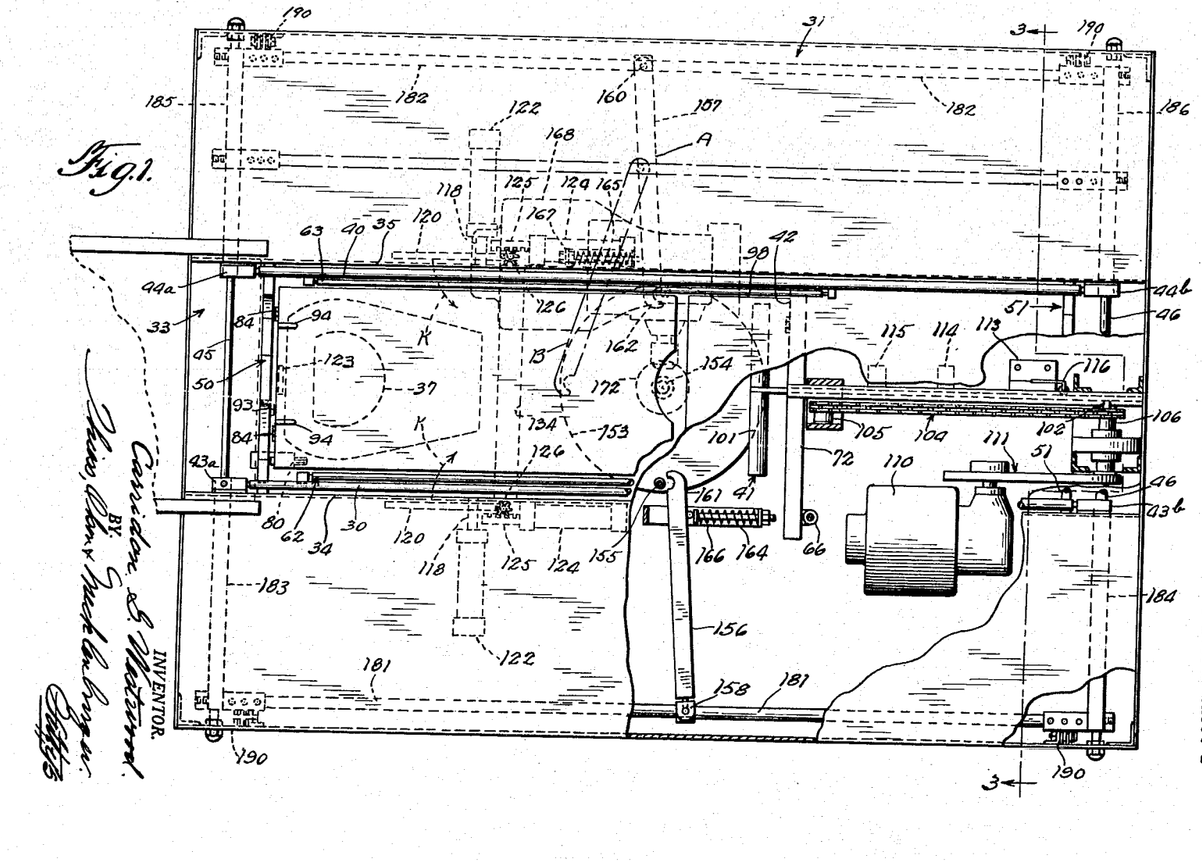
Fig. 1 is a fragmentary top plan view of the machine with a portion of the table cut away to expose a part of the mechanism mounted thereunder and showing, in dotted lines, one of the pitman arms for actuating the folding rods in changed positions.
Figures 2, 14, 15:
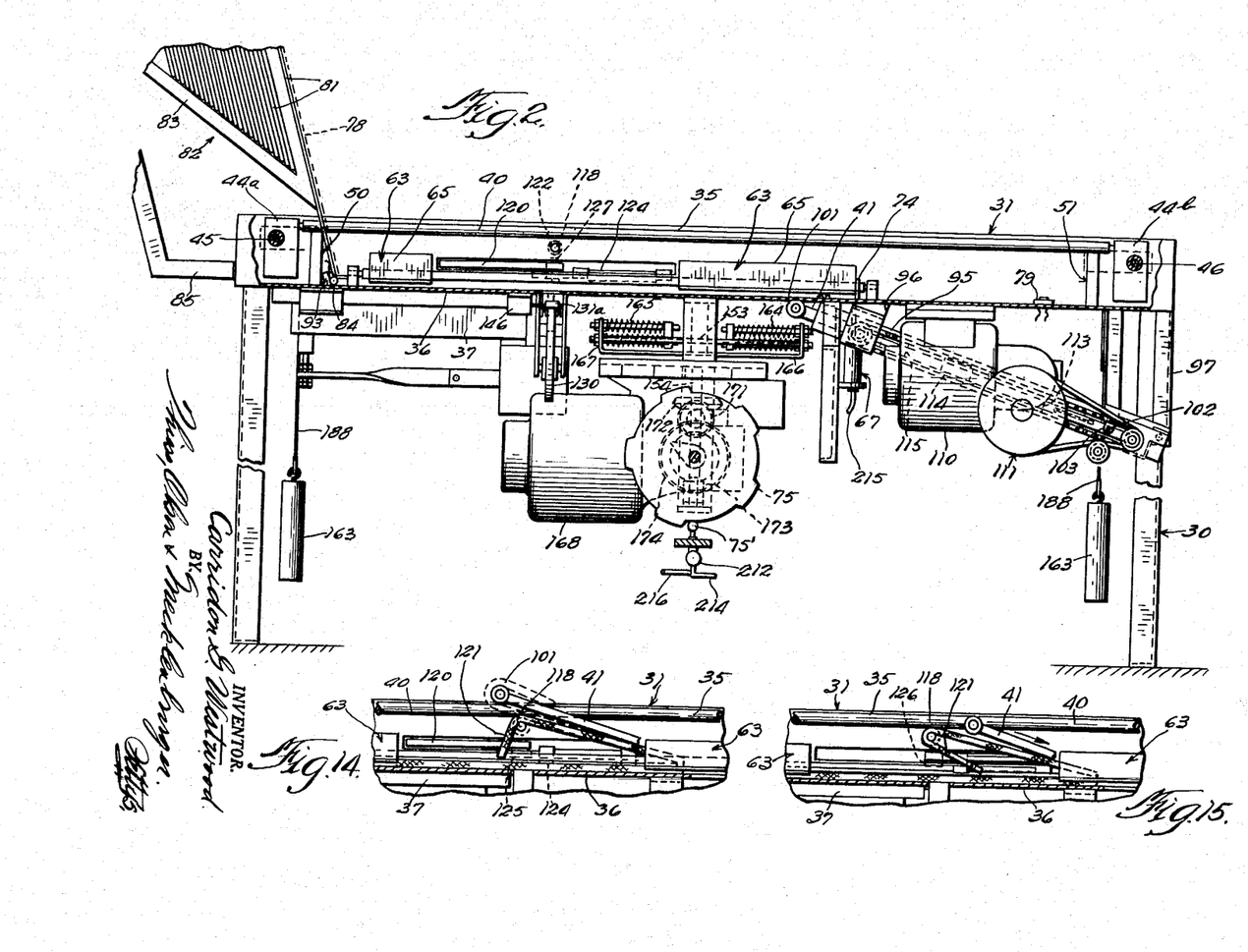
Fig. 2 is a fragmentary, side-elevational view of the machine shown in Fig. 1 with a portion of the table top cut away to expose the base of the well and showing, in dotted lines, the form plate in its fully-opened position.
Fig. 14 is a fragmentary, sectional, side-elevational view of the well showing the tail-folding arm in its fully-extended position and the end of the tail portion of the garment overhanging the rest bars.
Fig. 15 is like Fig. 14 but showing the tail-folding arm receding into the well and the end of the tail portion of the garment folded back under the first tail fold by the fold-back fingers.
Figure 3:
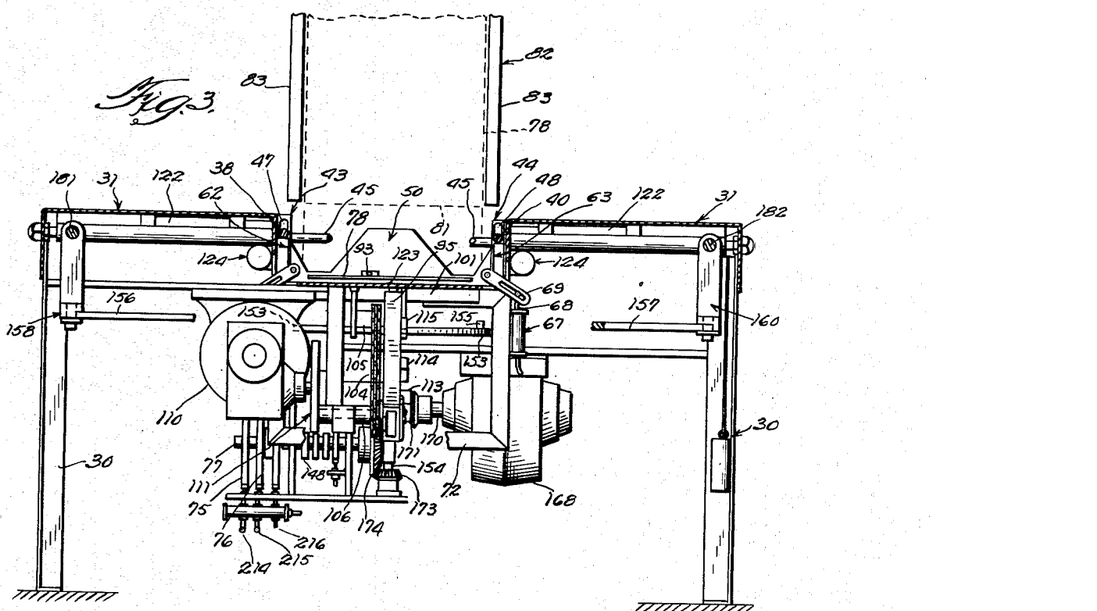
Fig. 3 is a fragmentary, sectional view of the machine taken along line 3—3 of Fig. 1.

When the form plate is in its fully open or upright position, shown in dotted lines, Figs. 2 and 3, a cardboard templet 81 is automatically fed onto one side or surface of the plate by a templet feeding assembly 82. The assembly comprises a hopper or bin 83 for holding the templets 81 in a substantially vertical, face-to-face arrangement. The hopper 83 is disposed above the well and slightly to the rear of the hinge connections 84 for the form plate, and is secured to the table top 31 by a pair of L-shaped braces 85. Mounted on the face of the hopper against which the form plate rests, when in its upright position, is an air cylinder 86 adapted to actuate a pusher blade 87 which, in turn, engages the upper edge 88 of the templet adjacent the form plate, and slides the templet in place on one surface of said plate. The piston 90 of air cylinder 86 is rigidly mounted on a supporting strap 91, which is fastened to the hopper, and the cylinder 92 which is secured to the pusher blade 87 is adapted to reciprocate on the piston. The operation of the air cylinder 86 is controlled by a valve 93 which is mounted on the well base and is actuated by the form plate 78 when it is in its fully upright position. The templet, which is substantially the same shape and size as the plate 78, is held in place on said plate by a pair of leaf springs 94 (see Fig. 1).

The tail-folding arm 41, as heretofore mentioned, is adapted to be actuated, subsequent to the folding of the side portions 32c and 32d of the shirt, and fold the tail portion of the shirt over the former plate and templet. The arm 41 is slidably mounted on a guide plate 95, which is secured to the underside of the well base by brackets 96 and 97, and is offset approximately 20° with respect thereto. The opening 42, provided in the well base 36 and through which arm 41 projects, is positioned just beyond the end of the form plate 78 when it is in its lowered or operative position. A hinged cover 98 is provided for opening 42 and is adapted to lie flush with the well base when the arm 41 is fully retracted.

Guide plate 95 is channel shaped in cross-section and has the edge of the flanged sides thereof turned inwardly to form a slot 100, which extends longitudinally the entire length of the plate along one side thereof. The head 101 of the folding arm 41, in this instance, is T-shaped. Transversely mounted on the lower end of arm 41 is a pin 102 which projects transversely through slot 100. The end of the pin 102 is swivelly mounted on a drag-link 103, which in turn forms part of drive chain 104. The chain 104 is supported at either end by an idling sprocket 105 positioned opposite the upper end of the guide plate and a drive sprocket 106 positioned opposite the lower end of the guide plate. The axes of sprockets 105 and 106, the longitudinal center line of the slot 100, the pin 102, and the aperture 107 formed in the apron 108 of the drag-link 103 are all in the same plane. The drive sprocket 106 is power-actuated by a motor 110 and pulley assembly 111, mounted to the underside of the well base. The motor, in this instance, is a uni-directional type and the drag-link 103, when ascending toward the well base, causes the arm 41 to project out through opening 42. Upon the drag-link reaching idling sprocket 105, it is adapted to ride around the outer periphery thereof and, at the same time, pivot about pin 102. The pin at this moment is coincident to the axis of the sprocket. The arm 41, at this point, has reached its fully projected position and, upon the drag-link 103 descending from the well base, the arm 41 is retracted through opening 42 to its fully retracted position beneath the surface of the well base. The fully-retracted position is reached when the pin 102 has made a quarter turn around drive sprocket 106, at which time the power from the motor 110 is shut off and the arm 41 rests in this position until the period is reached in the next folding cycle when it is to be actuated. The period of operation of motor 110 is controlled by the cam 112 mounted on timing shaft 77, which cooperates with breaker switch 112' (see Fig. 8).

On the side of guide plate 95, opposite the slotted side, are mounted a plurality of control devices 113, 114, and 115. Device 113 is a microswitch which is positioned at the lower end of the plate and is actuated by the lower end of the folding arm 41. A trip arm 116 for switch 113 has its free end adapted to project through an opening 117 formed in the side of the guide plate. After the folding arm 41 has commenced its ascending stroke, the free end of the trip arm 116 drops into the opening 117, closing the switch 113, which in turn shunts out the timing cam 112 and power is supplied directly to the motor 110 through microswitch 113. Upon return of the arm 41 to its rest position, the trip arm 116 is pushed out of the opening 117 and the shunting circuit is broken and the timing cam 112 is once again placed in series with motor 110.

Device 114, which is a trip valve for the rest bars 118, which will be described more fully later, is positioned on the guide plate approximately midway between the sprockets 105 and 106. The valve is likewise actuated by the end of the folding arm 41.

Device 115 is a trip valve for the fold-back fingers 120, which will be described more fully later, and is positioned on the guide plate intermediate the device 114 and idling sprocket 105. Valve 115, which is likewise actuated by the movement of the lower end of folding arm 41, acts only as a trip valve for the fold-back fingers 120. Valve 114, on the other hand, acts both as a trip and release valve for the rest bars 118.

The speed with which the tail-folding arm 41 projects out, through opening 42, causes the end 121 of the tail-portion of the shirt 32 to flop over the rest bars 118, as seen in Fig. 14. The rest bars extend out from the walls 34 and 35 of the well when the arm 41 has projected approximately half its distance out from the well base, as shown in Fig. 13. The rest bars 118 are positioned between the folding rods, when the rods are in their rest positions, and the fold-back fingers 120. The bars 118 are actuated by air cylinders 122. The operation of the cylinders 122 is controlled by valve 114. When the end 121 of the tail-portion of the shirt is overhanging the extended rest bars 118, as seen in Fig. 14, and the folding arm 41 has reached its forward, or fully-extended position, the fold-back fingers 120, which are positioned along either wall and between the rest bars 118, and the well base 36 are actuated and each swings out, as indicated by the dotted arrows K in Fig. 1, toward the center of the well through an arc of approximately 180° and folds the end 121 of the tail-portion back under the rest bars 118, as seen in Fig. 15. Flanges 64 and 65 of holding fingers 62 and 63, respectively, are provided with suitable cut-out portions to enable the fold-back fingers 120 to swing unobstructed through their 180° arc. When the modified form of holding fingers 201 is employed, the fold-back fingers 120 may likewise pass under the crosspiece 206 unobstructed. The fingers 120 remain pointed, in a rearward direction, until the form plate 78 is raised up by the operator at which time a release valve 123 is actuated, causing the fingers 120 to swing, in the reverse direction 180°, and point in a forward direction. The release valve 123, as seen in Fig. 1, is positioned between the hinges 84 of the form plate 78 and is held in a closed position when the form plate is lying flat over the back of the shirt 32. The fingers 120 are actuated by air cylinders 124 mounted along the outside surface of the well walls 34 and 35. The ends 125 of the piston rods of air cylinders 124 are in the form of rack gears. Each rack gear meshes with a pinion gear 126, mounted on shaft 127, on which is also mounted the fold-back finger 120. The shaft 127 is rotatably mounted at either end in bearings, not shown, which are fastened to the underside of the table top 31. The fingers 120, when pointing in their forward, or rearward directions, are recessed into the well walls 34 and 35, thus preventing them from interfering with the operation of other moving parts of the machine.

After the end 121 of the tail portion of the shirt has been folded back under rest bars 118, the rest bars 118 are retracted into the well walls and the tail portion drops into place, over the back of the top center portion of the shirt.

Figure 17:
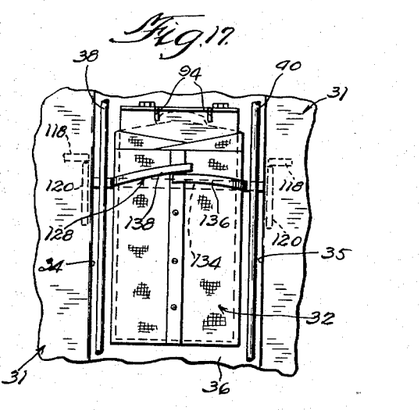
Fig. 17 is like Fig. 16 but showing the tail-folding arm, the rest bars, and the fold-back fingers fully retracted and the folded garment embraced by a strip of banding tape.

Subsequent to the folding of the side portions of the shirt by the folding rods 38 and 40, and the tail portion by the tail-folding arm 41 and fold-back fingers 120, the shirt is automatically embraced by a strip 128 of banding tape (see Fig. 17).

Figure 18:
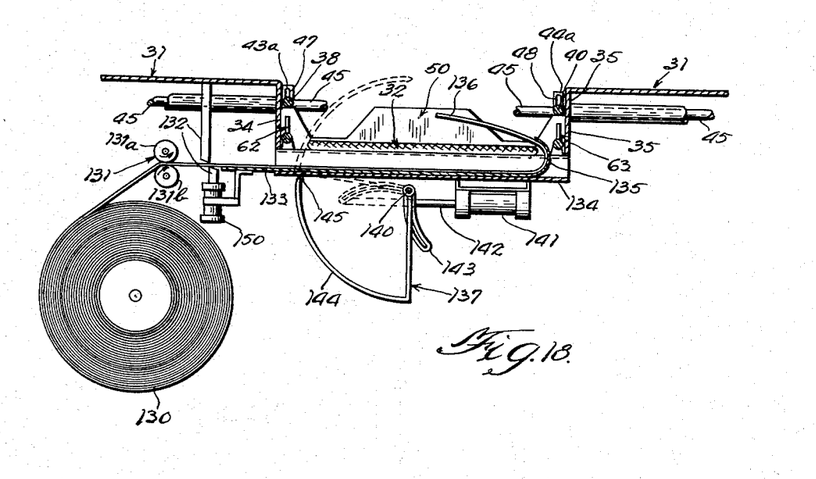
Fig. 18 is a diagrammatic view of the banding mechanism.

As seen in Fig. 18, a roll 130 of banding tape is rotatably mounted beneath the table top 31 and to one side of the well. The tape from the roll 130 is fed through a pair of power-actuated calibrating feed rolls 131a and 131b. From the calibrating rolls, the tape passes between the cut-off blades 132 and onto a tray 133. The tray 133 is disposed within a trough 134 formed in the base of the well. The tray 133 and trough 134 are positioned thwartwise the well. The tray 133, at the end opposite from the cut-off blades 132, is bent over to form a deflector 135. The deflector 135, which is positioned between the adjacent holding finger 63 and the form plate 73, directs the free end 136 of the tape over approximately one-half the width of the shirt. When the free end 136 of the tape has extended far enough over the folded shirt—that is, approximately one-half the width of the shirt, the feeder rolls 131 stop and the cut-off blades 132 are actuated to produce a strip 128 of tape. A band-carrier arm 137, disposed beneath the trough 134, then directs the cut end 138 of the strip 128 over the shirt, and the operator manually joins the ends 136 and 138 together. The carrier arm 137 is adapted to pivot about point 140 by means of an air cylinder 141. The piston rod 142 of the cylinder 141 engages a slotted finger 143 which is pivotally mounted to swing about point 140. The finger 143 is secured to carrier arm 137 and the two rotate together about point 140. The end 144 of the carrier arm 137 is arcuate in form and projects through a slot 145 formed in the trough and tray. The end 144, after passing through slot 145, engages the cut end portion of the strip 128 and forces the strip up through the space between the holding finger 62 and the edge of the form plate 73 and deposits the cut end 138 of the strip over the back of the shirt. The operative position of the carrier arm 137 is shown, in dotted lines, in Fig. 18. The feeder rolls 131 are actuated by a motor 146 mounted on the underside of the top 31 (see Fig. 2). The time of operation of motor 146 is controlled by a microswitch 147 connected in series therewith and which is actuated by a cam disc 148 mounted on timing shaft 77. One of the cut-off blades 132 is actuated by an air cylinder 150, whose operation is controlled by a trip and release valve 151. Valve 151 is actuated by cam disc 152 which is likewise secured to timing shaft 77. Valve 151 also acts as the trip and release valve for air cylinder 141 which actuates band carrier arm 137 above described.

The folding rods 38 and 40 are actuated in a direction thwartwise the well 33 by means of a power-driven pitman wheel 153, which is rotatably mounted beneath the well, and a series of co-operating levers (see Figs. 1 and 2). The wheel 153 is positioned approximately midway between the ends of the well and rotates counter-clockwise in a horizontal plane about shaft 154. Mounted on the outer periphery of wheel 153 is a vertically-extending stud 155. Alternately engaging the stud 155, as wheel 153 rotates, are a pair of pitman arms 156 and 157. The arms 156 and 157 are positioned substantially diametrically opposed to one another and are pivotally connected at their outer ends to connecting links 158 and 160 respectively. The adjacent ends 161 and 162 of arms 156 and 157, respectively, are hooked and point in opposite directions, so that the stud 155 will alternately engage the hooked ends and carry the respective pitman arm along with it as it travels through an arc of approximately 180°. In Fig. 1 the pitman arm 157 is shown in two positions A and B. In position A, the arm 157 is in rest position and the hooked end 162 is ready to engage the stud 155. When the arm is in this rest position A, the folding rod 40 which is operatively connected thereto is likewise in a rest position on edge portions 53 of track members 50 and 51, or rocker support 192 of track members 190. In position B, the stud 155 has travelled through an arc of approximately 90° and the folding rod 40 has travelled about half way across the well. When the stud 155 reaches the position shown in full lines, the folding rod 40 has reached its extreme fold position 40a (see Fig. 5) and the hooked end 162 of arm 157 becomes disengaged from stud 155, and the folding rod 40 and the arm 157 return as a unit to their rest position by the force exerted on the arm by counter-weights 163 (see Fig. 2). Each pitman arm, 156 and 157, as it is engaged by the stud 155 is held in positive engagement therewith by means of contact springs 164 and 165 respectively. The springs 164 and 165 are mounted on suitable brackets 166 and 167 which are secured to the underside of the table top.

The pitman wheel 153, as above mentioned, is driven in a counter-clockwise direction by a motor 168, which is mounted to the underside of the table top 31. On the end of the shaft 170 of motor 168 is mounted a bevel gear 171 which meshes with a bevel gear 172, keyed to shaft 154 of the pitman wheel 153. To the lower end of shaft 154 is keyed a second bevel gear 173 which meshes with a bevel gear 174 keyed to the end of the timing shaft 77 (see Fig. 8). Motor 168 is connected in series with safety switch 80, heretofore mentioned, and also in series with a parallel combination of the operator or starter switch, 79, and a breaker switch 175. The breaker switch 175 (see Fig. 8) is actuated by cam disc 176 which is mounted on timing shaft 77. The operator switch is normally open and, upon being depressed by the operator, the breaker switch 175, which is caused to be opened by cam disc 176, is shunted out, and power is fed directly to the motor 168 through the safety switch 80 and starter switch 79, causing the timing shaft 77 to rotate which, in turn, causes breaker switch 175 to be closed whereupon the motor will continue to operate after the operator has released the operator switch. The motor 168 will remain in operation until the circuit is broken by cam disc 176. As heretofore mentioned, before the operator switch or breaker switch 175 is operative, it is necessary that safety switch 80 be closed by the form plate 18 being laid over the back of the shirt 32, as seen in Fig. 10.

Positioned intermediate cam discs 148 and 176 on shaft 77 is cam disc 112 which actuates breaker switch 112' which is connected in parallel with microswitch 113. The two switches 112' and 113, as a parallel circuit, are connected in series with motor 110 which, as heretofore mentioned, is the source of driving power for the tail-folding arm 41. When arm 41 is fully retracted, microswitch 113 is open and the motor 110 is operated by cam disc 112 which closes breaker switch 112' and starts motor 110 which, in turn, causes arm 41 to commence telescoping out of guide plate 95. After the lower end of arm 41 has passed by opening 117, trip arm 116 drops into opening 117 causing microswitch 113 to close and shunt out breaker switch 112'. Upon retracting of arm 41 into guide plate 95, the circuit to the motor 110 is broken and the arm remains inoperative until cam disc 112 once again closes breaker switch 112' and starts the drive motor in operation.

Positioned on timing shaft 77 intermediate cam disc 76 and support 180 is a cam disc 207 which controls the operation of trip and release valve 208. Valve 208 regulates the air supplied to air cylinder 210 which, in turn, actuates the collar expander mechanism 37 (see Figs. 21 and 22). Trip and release valves 75', 76', and 208 are all mounted on a suitable bracket 211 and are connected to a drum member 212. The drum member 212 is disposed below bracket 211. The air is supplied from an outside source through a connecting tube 213 to member 212. From member 212 the air is distributed by tube 214 to air cylinder 66 for holding finger 62, by tube 215 to air cylinder 67 for holding finger 63, and by tube 216 to air cylinder 210 for the expander mechanism 37.

Figure 21:
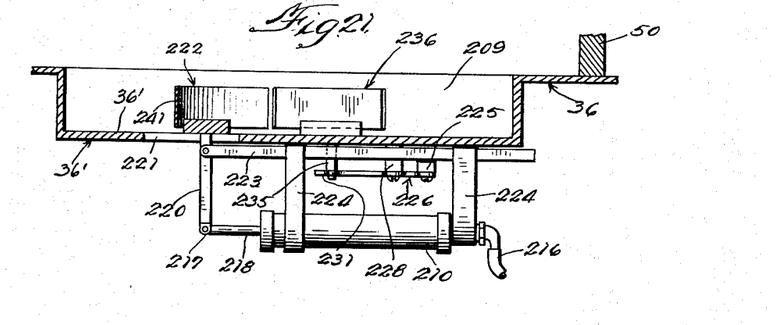
Fig. 21 is a sectional view of the collar expander mechanism taken along line 21—21 of Fig. 22.
Figure 22:
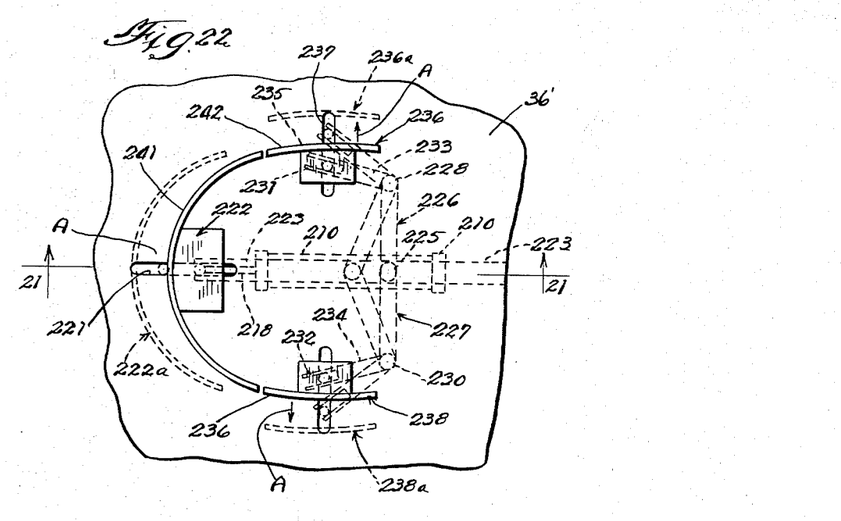
Fig. 22 is a fragmentary top plan view of the collar expander mechanism.

The collar expander mechanism, shown in Figs. 21 and 22, is mounted within a recess 209 formed in well base 36. Air cylinder 210 for the collar expander mechanism is mounted on the underside of the recess 209. Cylinder 210 is substantially parallel to the surface 36' of the recess. On the free end 217 of cylinder piston 218 is rigidly mounted a vertically-extending arm 220. The arm 220 projects through an elongated slot 221 formed in surface 36' and is fastened at its upper end to a front spreader block 222. Secured to arm 220 intermediate the ends thereof and adjacent the underside of surface 36' is a slide bar 223. The bar 223 and air cylinder 210 are parallel to one another. Brackets 224 support slide bar 223 and air cylinder 210. The brackets also serve as guides for slide bar 223. Pivotally mounted on bar 223, at a point designated 225, are a pair of bell crank levers 226 and 227. The levers 226 and 227 are disposed on opposite sides of slide bar 223 and are pivotally mounted on the underside of surface 36' at points 228 and 230 respectively. The ends 231 and 232 of arms 233 and 234 of bell crank levers 226 and 227, respectively, are bifurcated. End 231 of arm 233 engages a stud 235 which is mounted on the underside of one of the side spreader blocks 236. The stud 235 extends through an elongated slot 237 formed in surface 36'. A similar connection is provided for the other side spreader block 238.

The collar expander is normally contracted so that the shirt collar may readily be positioned thereon, or removed therefrom, by the operator.

Upon air being supplied to air cylinder 210, the piston 218 is caused to telescope out of the cylinder. As the piston 218 is thus actuated, the spreader blocks 222, 236, and 238 are moved outwardly as indicated by arrows A. When the blocks are in positions indicated by 222a, 236a, and 238a, the collar is snugly engaged by the expander mechanism. The elongated slots 221, 237, and 240, the latter being provided for block 238, are of such length so as to enable the spreader blocks to fit all size collars. The collar contacting surfaces 241, 242, and 243 of spreader blocks 222, 236, and 238, respectively, are arcuate so as to conform substantially to the inside periphery of the collar.

The timing shaft 77 is rotatably mounted to the underside of table top 31 by means of brackets 180. The shaft 77 is positioned under the table top such that the cam and timing discs are readily accessible to the operator if minor adjustment thereof is required.

The movement of the pitman arms 156 and 157 are transmitted to the folding rods 38 and 40, respectively, by means of power bars 181 and 182, which are connected to pitman arms 156 and 157 by connecting links 158 and 160, respectively. The power bars 181 and 182 are disposed beneath the table top at either side and extend substantially the entire length of the well 33. The power bars 181 and 182 are slidably mounted at either end to guide rods 45 and 46. The ends of power bar 181 are connected to supporting blocks 43a and 43b by sleeve members 183 and 184 respectively. Likewise, the ends of bar 182 are connected to supporting blocks 44a and 44b by sleeve members 185 and 186 respectively. Sleeve members 183 and 185 embrace guide rod 45, and sleeve members 184 and 186 embrace guide rod 46. Openings 187 are provided in well walls 34 and 35 for the sleeve members and guide rods. As each pitman arm is alternately drawn halfway around the pitman wheel by stud 155, the power bars move toward the well along the guide rods, causing each pair of supporting blocks to move thwartwise the well. Upon release of the pitman arm by the stud 155, the pitman arm, associated power bar and sleeve members, and the supporting blocks are returned to their original position by the action of the counterweights 163, heretofore mentioned. The weights 163 are suspended from either end of the power bars by cables 188. The cables pass over idling pulleys 190 which are mounted on the underside of the table top 31 adjacent the corresponding ends of the power bars.

Figure 24:
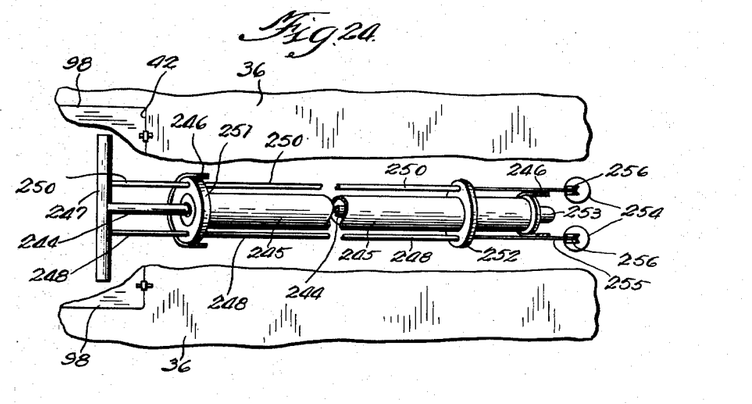
Fig. 24 is a fragmentary top plan view of a modified form of tail-folding arm.
Figure 25:
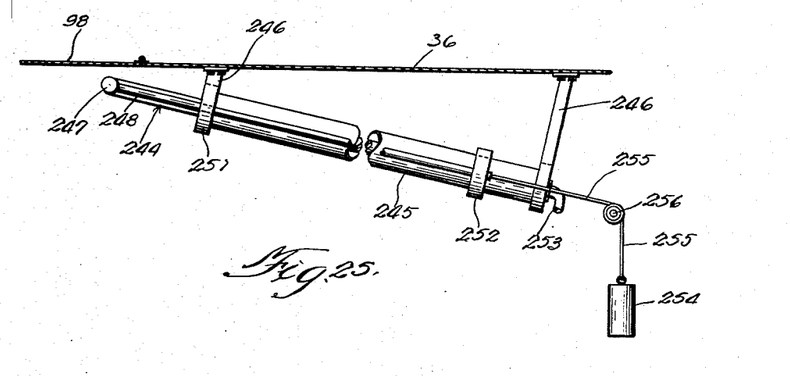
Fig. 25 is a fragmentary, side-elevational view of the modified form of tail-folding arm shown in Fig. 24.

In Figs. 24 and 25 is shown a modified form of tail-folding arm 244 and associated mechanism. The arm 244, in this instance, is air actuated instead of chain driven as heretofore described for tail-folding arm 41. The arm 244 functions as a piston and is slidably mounted within cylindrical housing 245. The housing 245, in this instance, is likewise angularly offset approximately 20 degrees with respect to well base 36 and is secured to the underside of said base by supporting brackets 246. Transversely mounted on the free or exposed end of arm 244 is a crosspiece 247. Disposed on either side of arm and in a parallel spaced relationship with respect to said arm are elongated guide bars 248 and 250. The bars are secured to the crosspiece by welding, or any other suitable means, and extend rearwardly along the outside of cylindrical housing 245. The bars extend through suitable openings formed in bearing collar 251 mounted on the upper end of housing 245, and are secured at their lower ends to a slider ring 252. The ring embraces the outside periphery of housing 245 and the ring, bars and arm reciprocate as a unit. The air for actuating arm 244 is supplied to the housing at its lower end through nozzle 253. The arm 244 is returned from its fully-extended position to its starting, or retracted, position, as shown in Fig. 25, by the pulling force exerted on ring 252 by counterweights 254. The weights are suspended from ring 252 by cables 255, which are secured to the ring, and pass over idling pulleys 256. The pulleys are rotatably mounted to the supporting frame, not shown.

The air which is supplied to cylindrical housing 245 through nozzle 255 for the collar expander may be regulated in a manner similar to that described for the air cylinder 210. In other words, another cam disc is mounted on timing shaft 77 which would cooperate with an air valve mounted on bracket 211.

When tail-folding arm 244 is employed, motor 110 and the chain drive 104 and other associated mechanisms would be eliminated. Also, microswitch 113 would not be required; the trip and release valve 114 and trip valve 115 which, as shown in Fig. 7, are mounted on the side of guide plate 95, are moved adjacent the timing shaft 77 and are actuated by cam discs mounted on said shaft.

The complete cycle of the folding operation for the machine shown in Figs. 1, 2, and 3 is as follows: (a) the unfolded shirt is laid on the table top face down by the operator who aligns and positions the center portion of the shirt in the well and places the collar over the collar expander mechanism; (b) the form plate, with the cardboard templet in place, is laid over the back of the bosom of the shirt disposed within the well, thereby causing the safety switch to close; (c) the operator pushes the operator button or switch to start the pitman wheel to rotating and cause the collar expander to expand; (d) the side portions of the shirt are alternatively folded in the well by the folding rods; (e) subsequent to the folding of the side portions of the shirt, the tail portion of the shirt is folded over the extended rest bars by the tail-folding arm; (f) as the tail-folding arm recedes into the well, the ends of the tail portion of the shirt are folded back under the rest bars, and the collar expander is contracted; (g) the rest bars are then retracted, and the tail portion, with the ends thereof tucked under, falls into place over the back of the bosom portion of the shirt and the form plate; (h) the folded shirt is then embraced by a strip of banding tape, the ends of which are joined by the operator; (i) the form plate, with the folded and banded shirt thereon, is then raised manually by the operator and the shirt with the cardboard templet disposed within is withdrawn endwise from the form plate by the operator; and (j) after the shirt and templet are removed from the form plate, the operator moves the form plate to its fully-opened position whereby another cardboard templet is automatically fed onto the form plate and the above cycle repeated.

Thus, it will be seen that a machine has been provided which will completely, automatically, uniformly, and quickly fold a shirt, or other similar type garment regardless of its size. A machine has also been provided which will readily fold back the ends of the tail portion of the shirt under the first fold of said tail portion. Furthermore, a machine has been provided for folding and banding shirts which is of durable and compact construction, does not fatigue the operator, and does not require a person possessing any particular skill or talent to operate. Also, the working parts of the machine are mounted on the table top thus enabling the machine to be supported in various ways.

While several embodiments of this invention are shown above, it will be understood, of course, that the invention is not to be limited thereto, since many other modifications may be made, and it is contemplated, therefore, by the appended claims, to cover any other modifications as fall within the true spirit and scope of this invention.

I claim:

1. A garment-folding machine comprising a table over the top of which a garment may be laid, said top being provided with a well extending substantially the length thereof, first folding means disposed at either side of said well and mounted for movement in a direction substantially thwartwise said well and beneath the plane of said top to effect folding of the side portions of the garment over the center portion of the garment lying within said well, and second folding means mounted on said top for movement in a direction substantially lengthwise said well to effect folding of one end portion of the garment over the other end portion of the garment.

2. A garment-folding machine comprising a table over the top of which a garment may be laid, said top being provided with a recessed well extending substantially the length of said top, power-actuated folding means disposed on either side of said well and adapted to alternately move in a direction substantially thwartwise said well and fold the side portions of the garment over the center portion thereof lying within said well, and means disposed within said well for guiding said folding means during said thwartwise movement.

3. A garment-folding machine comprising a table over the top of which a garment may be laid, said top being provided at the center thereof with a recessed elongated well extending substantially the length thereof and having the center portion of said garment resting on said top lying therein, a form hingedly mounted within said well at one end thereof, and adapted to be laid over the adjacent end portion of the garment, folding means mounted along either wall of said well and adapted to move in a direction substantially thwartwise said well and fold the side portions of the garment across said center portion and said form.

4. A garment-folding machine comprising a table over the top of which a garment may be laid, said top being provided with an elongated well extending the length of said top, and into which a portion of the garment resting on said top is positioned, said well having substantially parallel, vertically-extending walls and a substantially horizontal base, a folding rod arranged along each wall of said well and extending substantially the length thereof, said rods adapted to move alternately across the base of said well and fold the portions of the garment lying outside the well over the portion lying therein, power means for actuating said rods, and track members for said rods mounted within said well at either end thereof; the end portions of said rods adapted to contact said tracks and follow the periphery of the edge portion of said tracks while moving across said well.

5. A garment-folding machine comprising a table over the top of which a garment may be laid, said top being provided with an elongated well extending the length of said top, and into which a portion of the garment resting on said top is positioned, said well having substantially parallel, vertically-extending walls and a substantially horizontal base, a folding rod arranged along each of said parallel walls and extending substantially the length thereof, said rods adapted to move alternately across the base of said well to fold the portions of the garment lying outside the well over the portion lying therein, power means for actuating said rods, a pair of track members for said rods mounted within said well and having one of said members positioned at either end of said well and extending thwartwise said well, the edge of said track members providing a ledge for the corresponding end portions of said rods.

6. A garment-folding machine comprising a table over the top of which a garment may be laid, said top being provided with a well which extends substantially the length thereof, folding rods mounted within said well along either wall thereof, supporting blocks mounted at either end of said rods, said rods and blocks adapted to move as a unit in a direction thwartwise said well, and track members mounted within said well and positioned thwartwise therein, said track members providing ledges for said rods upon their movement across said well.

7. A garment-folding machine comprising a table over the top of which a garment may be laid, said top being provided with a well which extends the length thereof and into which a portion of the garment is positioned, folding rods mounted within said well along either wall and extending substantially the length thereof, supporting blocks for said rods mounted at either end of said rods, said rods and blocks adapted to move as a unit in a direction thwartwise said well and fold the portions of the garment lying outside said well over the portion lying therein, and a pair of track members mounted thwartwise within said well and having the upper edge portion of said members contacting the adjacent end portions of said rods and providing a ledge therefor, said upper edge portion having a deformed periphery over which said rods follow upon movement thereof across said well.

8. A garment-folding machine comprising a table over the top of which a garment may be laid, said top being provided with a well which extends the length thereof and into which a portion of the garment is positioned, folding rods mounted within said well along either wall and extending substantially the length thereof, supporting blocks for said rods mounted at either end of said rods, said rods and blocks adapted to move as a unit in a direction substantially thwartwise said well and fold the portions of the garment lying outside said well over the portion lying therein, and a pair of parallel track members mounted thwartwise within said well and intermediate said supporting blocks, the length of said members being substantially the width of said well, said members having the upper edges thereof deformed and providing ledges for said rods to follow upon movement thereof across said well.

9. A garment-folding machine comprising a table over the top of which a garment may be placed, said top being provided with a well extending the length thereof and into which the center portion of the garment is positioned, folding means mounted within said well and adapted to move alternately in a direction thwartwise said well, and return to its starting position and fold the side portions of the garment over the center portion thereof, and means for preventing dragback of the folded side portions of the garment resting within said well upon return of said folding means to starting position.

10. A garment-folding machine comprising a table over the top of which a garment may be placed, said top being provided with a well extending substantially the length thereof and into which the center portion of the garment resting on said top is positioned, folding means mounted within said well along the walls thereof, each of said folding means adapted to alternately move across substantially the width of said well and return to its starting position, whereby the side portions of the garment are folded over said center portion, and means mounted within said well for retaining in place the folded side portions of the garment resting within said well upon return of said folding means to the starting position.

11. A garment-folding machine comprising a table over the top of which a garment may be placed, said top being provided with a well extending substantially the length thereof and into which the center portion of the garment is positioned, a pair of folding rods mounted along the walls of said well, each of said rods adapted to alternately move from the adjacent wall in substantially a thwartwise direction and approach but not reach the opposite wall, and then return to its starting position whereby the side portions of said garment are folded over said center portion, and finger elements mounted within said well adjacent said walls and adapted to engage the folded side portion of the garment adjacent thereto upon return of the opposite folding rod to its starting position.

12. A garment-folding machine comprising a table over the top of which a garment may be laid, said top being provided with a well having a pair of substantially parallel, vertically-extending walls and a substantially horizontal recessed base and into which a portion of the garment is positioned, and a folding means mounted within said well along one of said parallel walls and adapted to reciprocate across said well whereby the portion of the garment lying outside the well and resting on said top is folded over the portion of the garment lying therein.

13. A garment-folding machine comprising a table over the top of which a garment may be laid, said top being provided with an elongated well disposed lengthwise thereon and into which a portion of the garment is positioned, said well having a substantially horizontal base and a pair of substantially parallel vertically-extending walls, a pair of elongated folding rods mounted within said well, one of said rods being disposed along each of said walls, and adapted to alternately reciprocate thwartwise said well whereby the portions of the garment lying outside the well and on said top are folded over the portion of the garment lying therein, a pair of like track members mounted within said well in a transverse direction, each of said members having the upper edge surface thereof contacting the corresponding ends of said rods, said upper edge surface being deformed so that when said rods alternately reciprocate, across said well, the rod first descends to a position adjacent the base of said well and moves in a horizontal direction for a short distance, and then ascends to a position relatively distant from said base and moves in a horizontal direction for a short distance and then descends, once again, to a position adjacent the base and moves in a horizontal direction towards the opposing wall but stopping at a point spaced from said wall, whereupon the rod moves in the opposite direction and returns to its starting position following said deformed edge.

14. A garment-folding machine comprising a table over the top of which a garment may be laid, said top being provided with an elongated well disposed lengthwise thereon and into which a portion of the garment is positioned, said well having a substantially horizontal base and a pair of substantially parallel vertically-extending walls, a pair of elongated folding rods mounted within said well, one of said rods being disposed along each of said walls, and adapted to alternately reciprocate thwartwise said well whereby the portions of the garment lying outside the well and on said top are folded over the portion of the garment lying therein, a pair of like track members mounted within said well in a transverse direction having the upper edge surfaces thereof providing supporting ledges for the corresponding end portions of said rods; each of said track members comprising a pair of supports, each of said supports being rockably mounted on said upper surface and adjacent one of said well walls, said rods, when in their inoperative position, having the corresponding end portion thereof resting on the upper section of said support and causing said support to assume a tilted position with respect to a portion of said edge surface, and when said rods are in their operative position, causing said support to assume an upright position whereby said upper section lies in a plane flush with respect to said portion of said edge surface.

15. A garment-folding machine comprising a table over the top of which a garment may be laid, said top being provided with an elongated well disposed lengthwise thereon, said well having a substantially horizontal base and a pair of substantially parallel, vertically-extending walls, a pair of elongated folding rods, one of said rods being juxtaposed each of said walls, and adapted to reciprocate in a direction substantially thwartwise said base, rod-supporting blocks disposed at either end of said rods and adapted to reciprocate in a horizontal plane across said base, each of said blocks being provided with a vertically-extending slot into which the corresponding end of said rod is positioned.

16. A garment-folding machine comprising a table over the top of which a garment may be laid, folding means mounted along either side of said top and adapted to move thwartwise said top and fold the side portions of the garment over the center portion thereof, a second folding means adapted to project out of said top in a lengthwise direction when in its operative position and fold one end portion of the garment resting on said top over the other end portion thereof and then retract into said top when in its inoperative position.

17. A garment-folding machine comprising a table over the top of which a garment may be laid, said top being provided with an opening, folding means mounted lengthwise along either side of said top for movement in a plane substantially parallel to said top and in a direction thwartwise of said top to fold the side portions of the garment over the center portion thereof, a second folding means adapted to project outwardly from said top through said opening and when in its operative position, to extend over substantially one-half the length of the garment resting on said top, and fold one end portion of said garment over the other end portion thereof, and then retract through said opening into an inoperative position.

18. A garment-folding machine comprising a table over the top of which a garment may be laid, said top being provided with an opening, folding means mounted on said top and adapted to fold the side portions of the garment over the center portion thereof, and a second folding means adapted to fold one end portion of the garment over the other end portion thereof; said second folding means comprising a projectable and retractable folding arm, a guide plate for said arm mounted on the underside of said top, and power means for actuating said arm whereby one end of said arm projects through said opening and moves in a plane oblique with respect to said top and extends over substantially one-half the length of the garment resting on said top and then retracts through said opening until said one end of said arm is below the plane of said top.

19. A garment-folding machine comprising a table over the top of which a garment may be laid, said top being provided with an opening, folding means mounted on said top and adapted to fold the side portions of the garment over the center portion thereof, and a second folding means adapted to fold one end portion of the garment over the other end portion thereof; said second folding means comprising a projectable and retractable folding arm slidably mounted on a guide plate, said arm provided at its lower end with a laterally extending pin which projects through a slot formed in said plate, said slot extending substantially the length of said plate, said plate being mounted on the underside of said top and angularly offset with respect to said underside, a pair of rotatably mounted sprockets, one positioned at either end of said slot, a co-operating endless chain, said chain having a drag-link mounted thereon, said link provided with an aperture into which said pin is swivelly mounted, the axis of rotation of said sprockets, the center of said aperture and pin, and the longitudinal center-line of said slot being in a common plane, and power means for actuating said chain.

20. A garment-folding machine comprising a table over the top of which a garment may be laid, said top being provided with an opening, folding means mounted on said top and adapted to fold the side portions of the garment over the center portion thereof, and a second folding means adapted to fold one end portion of the garment over the other end portion thereof; said second folding means comprising a guide plate mounted on the underside of said top and angularly offset with respect thereto, said plate being provided with a slot extending the length thereof, a projectable and retractable folding arm slidably mounted on said plate and having a laterally-extending pin mounted on the lower end thereof extending through said slot, a chain drive for said arm having the chain thereof juxtaposed the slotted side of said plate and provided with means whereby said pin is operatively connected thereto and enables said pin to reciprocate substantially the length of said slot upon movement of said chain in one direction only.

21. A garment-folding machine comprising a table over the top of which a garment may be laid, said top being provided with an opening, means for folding the side portions of the garment over the center portion thereof, a second means for folding one end portion of the garment resting on said top over the other end thereof, said second means comprising an arm adapted to project out of said opening and move lengthwise over said top in a plane oblique with respect to said top and then retract through said opening to a position below the plane of said top.

22. A garment-folding machine comprising a table over the top of which a garment may be laid, said top being provided with an opening, means for folding the side portions of the garment over the center portion thereof, a second means for folding one end portion of the garment resting on said top over the other end thereof, said second means being actuated and comprising a housing mounted on the underside of said top and angularly offset with respect thereto, and an air responsive arm reciprocally mounted within said housing, adapted to project out of said housing through the opening in said top and move in substantially a lengthwise direction over said top.

23. A garment-folding machine comprising a table over the top of which a garment may be laid, a pair of power-actuated folding rods disposed at either side of said top and adapted to move in a direction substantially thwartwise of said top and fold the side portions of the garment over the center portion thereof, a power-actuated folding arm mounted on said top for movement in a direction substantially lengthwise said top to fold the lower end portion of the garment over the upper end portion thereof, and adjustable timing means for regulating sequence of operation of said rods and arm.

24. A garment-folding machine comprising a table over the top of which a garment may be laid, a form hingedly mounted on said top and adapted to be laid in a substantially flat position over a section of the center portion of the garment adjacent thereto, power-actuated folding means operatively connected to said top and adapted to be moved in a direction substantially thwartwise said top, garment, and form, and fold the side portions of the garment over the center portion thereof, a second power-actuated folding means adapted to be moved in a direction substantially lengthwise said top and fold one end portion of the garment resting on said top over the other end portion thereof and said form, and a safety device mounted on said top adjacent said form whereby the power for said machine is shut off when said form is in its raised position.

25. In a garment-folding machine having a table over the top of which a garment may be laid, the combination comprising first means mounted on said top for automatically folding the side portions of the garment over the center portion of the garment, second means mounted on said top for automatically folding the tail portion of the garment over the top center portion of the garment subsequent to folding by said first means, and means mounted on said top for automatically folding the end of said tail portion back under the first fold of said tail portion simultaneously with the folding by said second means.

26. A garment-folding machine comprising a table over the top of which a garment may be laid, said top having a well formed therein and extending substantially the length thereof, means for folding the side portions of said garment over the center portion thereof positioned within said well, means for folding the lower end portion of said garment over the upper end portion thereof, and means for embracing said garment with a strip of banding tape after the aforementioned folding operations; said third-mentioned means comprising a tape stock roll rotatably mounted on the underside of said top and to one side of said well and adjacent that section of the well covered by the upper center portion of the garment, calibrating rolls through which said tape is fed, a guide trough for said tape disposed thwartwise said well and adjacent said calibrating rolls, deflecting means mounted on the end of said trough for directing the free end of said tape from one side of the well and over a substantial portion of the width of said garment, cutting means disposed intermediate said calibrating rolls and the adjacent well wall for cutting a strip of tape of predetermined length from said stock roll, and means for directing the cut end of said strip from the other side of the well and over the garment whereby the two ends of said strip may be subsequently joined together.

27. A machine for completely folding a garment comprising a table over the top of which a garment may be laid, said top having a well formed therein and extending substantially the length thereof, said well having a pair of parallel, vertically-extending walls and a substantially horizontal base, means for folding the side portions of the garment over the center portion thereof which is positioned within said well, means for folding the tail portion of the garment over the upper end portion of the garment, and means for folding the end of the tail portion back under the first fold of said tail portion; said last-mentioned means comprising a pair of projectable and retractable rest bars, one of said bars mounted on each of said walls and opposite to one another and spaced above said well base, said bars adapted to project from said walls into said well and engage the folded tail portion at substantially the center thereof and hold the tail portion in a suspended position above the upper end portion of the garment, and a pair of fold back fingers pivotally mounted along either wall and disposed below said rest bars, said fingers adapted to swing rearwardly and fold the end of said tail portion back under said rest bars; upon said end of the tail portion having been folded under said rest bars, said bars are retracted.

28. A garment-folding machine comprising a frame having a substantially flat, horizontal top surface over which a garment may be laid, power-actuated folding means mounted on said top surface for substantially translatory movement in a direction thwartwise said top surface and in a substantially horizontal plane to effect folding of the side portions of a garment over the center portion of said garment, and a second power-actuated folding means mounted on said top surface for linear movement in a direction substantially lengthwise said top surface to effect folding of the lower end portion of said garment resting on said top surface over the upper end of the center portion of said garment.

29. A garment-folding machine comprising a table over the top of which may be laid a garment, releasable means mounted on said top for holding one end portion of said garment in place on said top during the folding of said garment, power-actuated folding means mounted on said top for substantially translatory movement in a direction thwartwise said top and in a plane substantially parallel with respect to said top to effect folding of the side portions of the garment over the center portion of said garment, and a second power-actuated folding means mounted on said top for linear movement in a direction substantially lengthwise said top to effect folding of the free end portion of the garment resting on said top over the held end portion of said garment.

30. A garment-folding machine comprising a table over the top of which a garment may be laid, a form plate hingedly mounted on said top and movable between a substantially upright position and a position substantially parallel with respect to said top and overlying the upper center portion of said garment, a templet disengageably mounted on one side of said form plate, a templet storage unit mounted on said top above the hinge connection for said plate, power-actuated feeder means mounted on said unit for automatically feeding a templet from said storage unit onto one face of said plate only when the latter is in said substantially upright position, control means operatively connected to said feeder means and engaged by said form plate, when the latter is in said substantially upright position, to effect actuation of said feeder means, and means mounted on said top and operative only when said form plate is in a position substantially parallel with respect to said top for folding the side and tail portions of said garment over said templet and form plate.

31. In a garment-folding machine having a substantially flat surface over which a garment may be laid, the combination comprising first means mounted for substantially translatory movement on said surface to effect automatic folding of the side portions of such a garment over the garment center portion, second means mounted for substantially translatory movement on said surface to effect automatic folding of the garment tail portion over the top center portion of such a garment subsequent to folding by said first means, third means mounted on said surface for automatically folding the end of the garment tail portion back under the first fold of the garment tail portion simultaneously with the folding by said second means, and fourth means mounted on said surface for automatically embracing said folded garment to effect banding thereof subsequent to folding by said second and third means.

32. In a garment-folding machine having a substantially flat surface over which a garment may be laid, the combination comprising a pair of first folding members, each of said members being mounted on said surface and in spaced relation with respect to the other member for alternate substantially translatory movement to effect automatic folding of the side portions of such a garment over the garment center portion, a second folding member mounted on said surface for substantially translatory movement in a direction at substantially a right angle with respect to the direction of movement of said first members for effecting automatic folding of the garment tail portion over the top center portion of such a garment subsequent to folding by said pair of first members, and means mounted on said surface for automatically embracing said folded garment to effect banding thereof subsequent to folding by said first and second members.

33. A garment-folding machine comprising a frame having a substantially flat top over which a garment may be laid, said top being provided with an elongated well into which the center portion of the garment resting on said top is aligned and positioned, and power-actuated folding means mounted on said frame within said well and having portions of said means positioned adjacent opposing sides of said well and alternately movable therefrom across said well beneath the plane of said top to effect folding of the side portions of the garment within said well.

34. A garment-folding machine comprising a frame having a substantially flat top over which a garment may be laid, said top being provided with an elongated well into which the center portion of the garment resting on said top is aligned and positioned, and power-actuated folding means mounted on said frame within said well and having portions of said means positioned adjacent to and of substantially the same length as the opposing elongated sides of said well, said portions being movable relative to one another crosswise of said well and beneath the surface of said top to effect folding of the side portions of the garment within said well.

35. A garment-folding machine comprising a frame having a substantially flat top over which a garment may be laid, said top being provided with an elongated recessed section into which the center portion of the garment resting on said top is aligned and positioned, and automatic means mounted on said frame within said recessed top section for completely folding such a garment within said recessed top section; said means having first portions movable relative to one another in a direction crosswise of said top section to effect folding of the side portions of the garment and a second portion movable, subsequent to movement of said first portions, in a substantially lengthwise direction of said top section to effect folding of one end portion of the garment over the other end portion thereof.

References Cited in the file of this patent

UNITED STATES PATENTS

| Number | Name | Date |
| --- | --- | --- |
| 1,733,353 | Maulsby et al. | Oct. 29, 1929 |
| 2,130,733 | Combarette | Sept. 20, 1938 |
| 2,305,359 | Steele | Dec. 15, 1942 |
| 2,362,976 | Cooper | Nov. 21, 1946 |
| 2,491,289 | Suhadjda | Dec. 13, 1949 |
| 2,508,108 | Gayring et al. | May 16, 1950 |
| 2,556,079 | Gayring | June 5, 1951 |